June 23, 1970 — A. C. BIGLEY, JR., ET AL — 3,516,820
COPPER SMELTING METHOD
Filed April 14, 1967

INVENTORS
ARTHUR C. BIGLEY, JR.
EMIL S. KRAMLICK
BY
ATTORNEYS

United States Patent Office

3,516,820
Patented June 23, 1970

---

3,516,820
COPPER SMELTING METHOD
Arthur C. Bigley, Jr., White Pine, Mich., and Emil S. Kramlick, Anaconda, Mont., assignors to The Anaconda Company, New York, N.Y., a corporation of Montana
Filed Apr. 14, 1967, Ser. No. 631,066
Int. Cl. C22b 15/04
U.S. Cl. 75—74                    2 Claims

ABSTRACT OF THE DISCLOSURE

Cupriferous charge materials are introduced substantially continuously into the smelting zone of a side charging reverberatory furnace through longitudinally extending slots formed in the furnace roof adjacent the two side walls of the furnace. The longitudinal slots extend substantially continuously the full length of the smelting zone, and feed hoppers having unimpeded openings that coincide with the longitudinal slots are disposed above the furnace. Charge material contained in the hoppers flows by gravity directly into the furnace to form a substantially continuous sloping bank of charge material disposed against each side wall of the furnace, the charge material substantially completely filling and thereby sealing the longitudinal slots formed in the furnace roof.

BACKGROUND OF THE INVENTION

In conventional processes for the production of metallic copper from sulfidic copper ores the beneficiated ore (commonly a flotation concentrate) is smelted in a reverberatory furnace to obtain a copper-containing matte comprising essentially a complex combination of copper and iron sulfides together with other metallic impurities and a slag comprising essentially a complex combination of iron and other metal silicates. The copper-containing matte is then treated in a converter to produce blister copper which is further refined to obtain the high purity copper of commerce.

A conventional copper smelting reverberatory furnace comprises an elongated refractory lined chamber the interior of which may, for convenience, be said to comprise a relatively short forward zone at which zone fuel and combustion air are introduced into the furnace, a relatively long intermediate zone occupying the major portion of the interior of the furnace in which zone the smelting of the cupriferous charge material (usually a sulfidic copper concentrate) takes place, and a rearward zone from which the products of the smelting operation (namely, the copper-containing matte, the slag and the combustion gases) are withdrawn or discharged from the furnace. A typical side charging reverberatory furnace may be about 120 feet long and about 30 feet wide and the intermediate smelting zone may be about 90 feet in length. The cupriferous charge material is introduced into the smelting zone through a plurality of longitudinally spaced charge openings formed in the furnace roof adjacent the two side walls of the furnace. In a typical furnace the charge openings comprise short sections of eight inch diameter pipe longitudinally spaced on five foot centers. The charge material introduced into the furnace through these charge openings forms a plurality of contiguous roughly semi-conical piles that are disposed against each of the side walls beneath each of the spaced charge openings in the furnace roof. The contiguous piles of charge material blend together to form two inwardly sloping banks of the material that extend longitudinally along both side walls the full length of the smelting zone and transversely inwardly toward the center of the furnace. Smelting of the charge material takes place on the surface of the sloping banks of the material and in a molten pool of slag and matte that is disposed between the two banks of material and that extends the length of the furnace.

The sloping banks of charge material protect the refractory lining of the side walls of the furnace against attack by the molten slag and matte in the smelting zone of the furnace. Accordingly, fresh charge material must be added from time to time to the sloping banks of the material within the furnace to replenish the charge material consumed in the course of the smelting operation. To this end a charge feed hopper is provided above each of the longitudinally spaced charge openings formed in the furnace roof, the feed hoppers containing a supply of charge material that is added to the furnace through a feed conduit having a gate-like closure at the bottom of the hopper. In conventional smelting practice the furnace is sealed off from the surrounding atmosphere during the major part of the smelting operation by valves or gates which close off the charge openings formed in the furnace roof. When the piles of charge material within the furnace have been smelted down to the point where they require replenishment, the fuel firing rate is sharply cut back, and then the valves or gates of the charge openings and the feed hoppers are opened to allow a "slug" of fresh charge material to enter the furnace and thus restore the sloping banks of the material within the furnace to their original condition. After charging, the furnace is then re-sealed and the temperature within the furnace is built up once again to smelt down the new charge piles.

The alternate cooling (relatively speaking) and reheating of the furnace caused by intermittent slug feeding of a large quantity of relatively cold charge material to the furnace adversely affects both the thermal and the metallurgical efficiency of the smelting operation. The fluctuation in furnace temperature causes all smelting conditions and reactions to cycle between maxima and minima and also causes excessive consumption of fuel. Moreover, operating difficulties are encountered in that the valves and other mechanical closures for the charge openings and feed hoppers eventually become worn or warped or otherwise fail in service. Slug feedings of the charge material can also be hazardous in that there is a tendency for the piles of relatively cold material to be undercut by the molten bath thus causing collapse of the charge pile and resultant explosions that are dangerous to personnel and equipment. However, in spite of the thermal and metallurgical inefficiencies inherent in the cycle operation of conventional side charging reverberatory furnaces, the difficulties encountered with the various mechanical devices required to seal the furnace between charging operations, and the potential danger of explosions due to undercutting of the charge piles, this type of furnace has been the standard in the art for over 50 years.

SUMMARY OF THE INVENTION

After an intensive investigation of causes and possible solutions of these and other problems inherent in the slug feeding of side charging reverberatory furnaces we have developed a new system for introducing fresh charge material into this type of furnace which may best be described as continuous choked slot feeding of the furnace. Our new system of choked slot feeding involves improvements in both method and apparatus by means of which charge material is introduced essentially continuously into the furnace to replenish essentially automatically, and without disruption of the smelting operation, the charge material in the sloping piles within the furnace that is consumed during the smelting operation. Specifically, in the practice of our invention the charge material is introduced into the furnace through two substantially continuous longitudinal slots that are formed in the furnace roof adjacent each side wall of the furnace and that extend substantially continuously the full length of the smelting zone of the furnace. Charge material contained in external charge reservoirs that are in direct and essentially unimpeded communication with the aforesaid longitudinal slots flows by gravity directly into the furnace to form substantially continuous sloping banks of charge material disposed against each side wall of the furnace. The charge material thus flowing into the furnace substantially completely fills and thereby seals the longitudinal slots formed in the furnace roof, and the sloping banks of charge material beneath the longitudinal slots protect the side walls of the furnace against attack by the molten bath.

To carry out the method of our invention a conventional side charging reverberatory furnace is modified by providing substantially continuous longitudinal slots on each side of the furnace roof adjacent the side walls of the furnace, the longitudinal slots extending substantially the full length of the smelting zone of the furnace. Feed hoppers are disposed above each of the longitudinal slots. The discharge openings of the feed hoppers are essentially unimpeded by gates or other mechanical closure, and these openings coincide with the longitudinal slots with which the hoppers are associated. As a result, feed material contained in the feed hopper can flow freely through the longitudinal slots into the interior of the furnace to form a substantially continuous sloping bank of charge material disposed against each side wall of the furnace and that extends the full length of the smelting zone. The two sloping banks of charge material build up in the furnace until the top of each bank reaches the respective longitudinal slot at which point the charge material in each sloping bank is in direct contact with the charge material flowing downwardly from the feed hopper. The charge material thus completely fills or chokes the longitudinal slots thereby sealing the slots and preventing atmospheric air from entering or furnace gases from escaping through these slots.

Continuous choked slot feeding of the furnace insures that the side walls of the furnace in the smelting zone will be substantially completely covered by the sloping banks of charge material with consequent protection of the refractory lining of the side walls. Moreover, in choked slot feeding the charge material enters the furnace as smelting occurs so that there is a more uniform smelting environment than is possible by "slug" type feeding of the furnace. In addition, the relatively large cross sectional area of the longitudinal slots (as compared to the cross sectional area of conventional charge openings) results in a decreased tendency for feed blockage at the slots with consequent lessening of reliance on operating labor on this account. Because of the constant feeding that occurs through the choked slots it is unnecessary to cut down on the fuel firing rate during the introduction of the charge material, and there has been no observed tendency for the molten bath to undercut the charge pile at the level of the bath. Because of the more uniform furnace operation, both in firing and in charging, our choked slot feed system greatly improves the opportunity for instrumentation and remote control of the smelting operation.

BRIEF DESCRIPTION OF DRAWINGS

Our new system of choked slot feeding of side charging reverberatory furnaces will be better understood from the following description thereof in conjunction with the accompanying drawings of which

DETAILED DESCRIPTION

Figure 1:
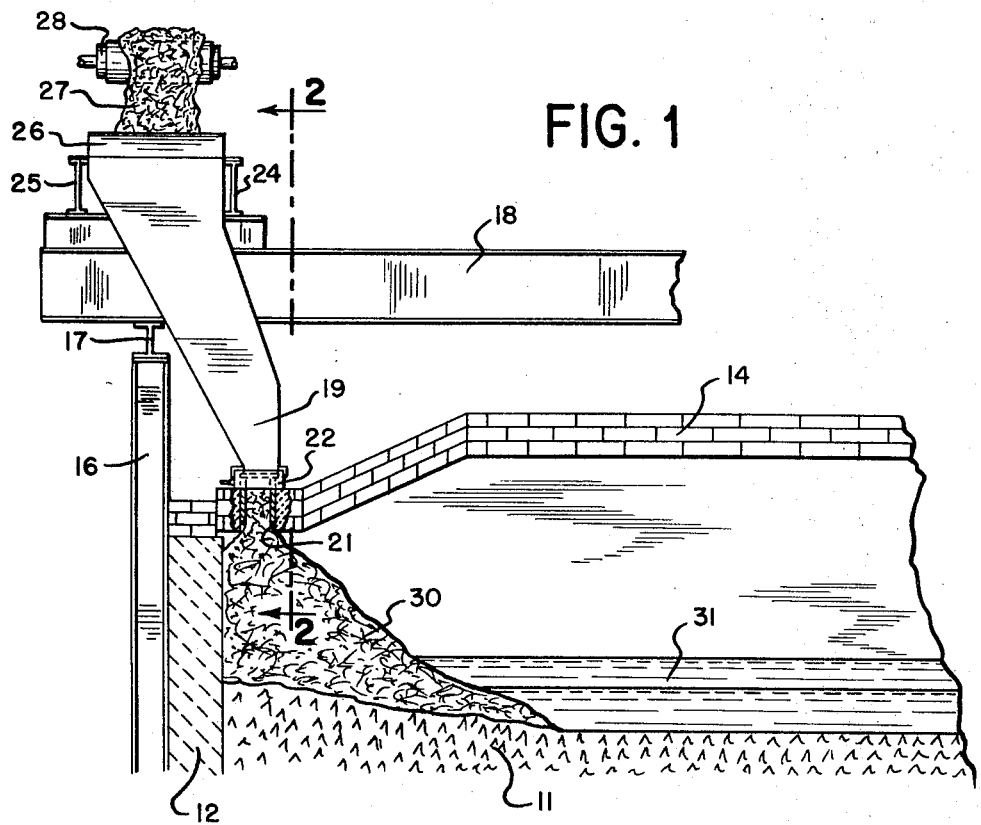
FIG. 1 is a fragmentary view showing in transverse section a portion of one side wall, the roof and the sloping bank of charge material within a side charging reverberatory furnace embodying our invention.

As previously pointed out, a conventional copper smelting reverberatory furnace comprises an elongated refractory lined chamber that in a typical case may be about 100 to 140 feet in length, about 20 to 40 feet in width and about 10 to 20 feet in height. The smelting zone of the furnace is typically about 80 to 100 feet in length and occupies the central or intermediate portion of the furnace between a forwardly located fuel feed zone and a rearwardly located product discharge zone. As indicated in FIG. 1, the main structural components of a reverberatory furnace comprise a refractory concrete floor 11, refractory lined side walls 12 (only one of which is shown in FIG. 1), refractory lined front and rear end walls (not shown), and a sprung arch roof or, preferably, a suspended roof 14 constructed of refractory bricks supported by exterior structural steel work.

The side walls of the furnace are reinforced and supported by a plurality of vertically disposed and longitudinally spaced steel buckstays 16 located at intervals of approximately five or six feet along the outside of both side walls of the furnace. The upper ends of the buckstays 16 disposed along one side of the furnace are secured to a longitudinal steel stringer 17, and the stringers 17 on opposite sides of the furnace are secured to a plurality of transverse steel beams 18 positioned at intervals corresponding to the longitudinal spacing of the buckstays 16. As a result, the vertical buckstays 16 and the transverse beams 18 act together to absorb the outward thrust of a sprung arch roof or to provide the exterior support structure from which a suspended roof may be hung. The buckstays 16 and beams 18 also provide support for the charge feed hoppers 19 hereinafter described.

In conventional side charging reverberatory furnace construction a plurality of longitudinally spaced charge openings are formed in the furnace roof along both sides of the roof adjacent each side wall of the furnace. These charge openings typically are formed of short lengths of eight inch diameter pipe that extend vertically through the furnace roof and that are spaced longitudinally at approximately five or six foot intervals. Charge feed hoppers having gates or other mechanically operated closures at the feed discharge end thereof are associated with each charge opening whereby cupriferous charge material may be introduced into the furnace as required. Charge material introduced into the furnace through the spaced charge openings form a plurality of contiguous roughly semi-conical piles that are disposed against each side wall of the furnace beneath the respective charge openings. The contiguous piles of charge material blend together to form two inwardly sloping banks of material that extend longitudinally along both side walls for the full length of the smelting zone and transversely inwardly toward the center of the furnace. The sloping banks of charge material do not, however, extend uniformly upwardly to the top edge of the side walls, and these sloping banks diminish in size as the charge material is consumed in the course of the smelting operation. Smelting of the charge material takes place on the surface of the sloping banks of the material and in a molten pool of slag and matte that is disposed between the two banks and that extends the full length of the furnace.

In accordance with out new system of choked slot feeding of reverberatory furnaces, the roof 14 of the furnace is formed with two substantially continuous slots 21 that extend longitudinally along both sides of the furnace substantially the full length of the smelting zone of the furnace. The longitudinal slots 21 are located adjacent the side walls of the furnace, and they are substantially continuous in that they are interrupted only at approximately five or six foot intervals by the relatively short sections (14a, 14b, etc.) of the brick work of the roof 14 associated with the buckstays 16 and the transverse beams 18. Thus, each of the longitudinal slots 21 comprises a plurality of segments (21a, 21b, etc.) that extend between the buckstays 16, each segment being approximately five or six feet in length and advantageously about one foot in width (although it is obvious that these dimensions will vary somewhat from furnace to furnace). Each segment of each longitudinal slot 21 is provided with a protective charge hopper collar 22 formed of reinforced refractory material and design to fit snuggly inside the segment with which it is associated.

Figure 2:
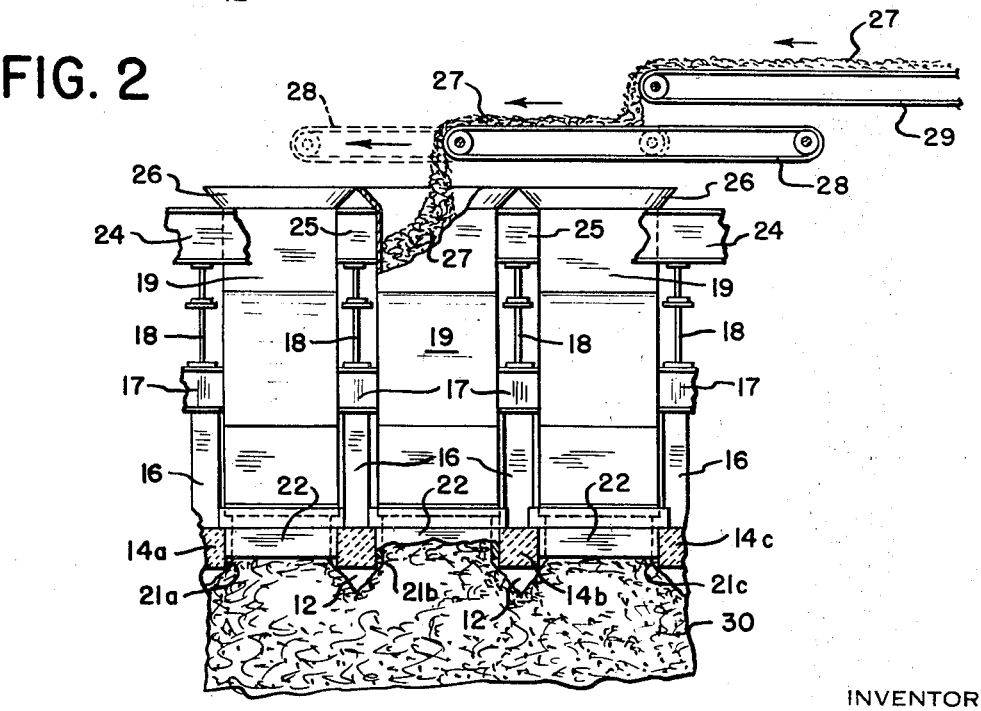
FIG. 2 is a fragmentary sectional view along lines 2—2 of FIG. 1 showing the substantially continuous longitudinal slots, the feed hoppers associated therewith and the means for introducing charge material into the feed hoppers according to our invention.

A charge feed hopper 19 is associated with each segment of the longitudinal slots 21. The hoppers 19 are disposed in a row along each side of the furnace and are mounted at their upper ends on two longitudinally extending beams 24 and 25 which, in turn, are supported by the transverse beams 18 and the buckstays 16 as shown in FIGS. 1 and 2 of the drawing. The lower end of each hopper 19 is received in the charge hopper collar 22 of the longitudinal slot segment with which that hopper is associated. Each hopper 19 is formed with an essentially unimpeded feed discharge opening having substantially the same dimensions as and coinciding with the slot segment therebelow. The upper end of each hopper 19 is provided with a longitudinally flared portion 26 that abuts the similarly flared portions of the adjoining feed hoppers 19 so that the open upper ends of the row of adjoining hoppers along each side of the furnace present the appearance of a single essentially continuous feed hopper opening. It should also be noted that, in the preferred embodiment of our invention shown in FIG. 1 of the drawing, the feed hoppers 19 extend laterally outwardly so that the means or mechanism for feeding charge material into the feed hoppers can be located to one side of rather than directly over the roof 14 of the furnace.

Cupriferous charge material 27 may be fed into the open upper ends of the feed hoppers 19 by any suitable means. In the embodiment of the apparatus as shown in the drawing a longitudinally movable belt feeder 28 is positioned above each row of feed hoppers 19 extending along the two sides of the furnace. The belt feeder 28 is longitudinally movable as indicated by the dotted lines in FIG. 2 so that the charge material 27 on the belt can be fed into each feed hopper 19 as required. A stationary belt feeder 29 in turn supplies the movable belt feeder 28 with charge material 27 drawn from a central storage facility (not shown).

As previously pointed out, the feed discharge openings of the feed hoppers 19 are essentially free of any impediment to the flow of charge material therethrough. As a result, the charge material introduced into the feed hoppers 19 by the belt feeder 28 flows freely through the discharge openings of the hoppers and through the longitundinal slots associated therewith into the interior of the furnace. The charge material thus introduced into the furnace forms a sloping bank 30 of material disposed against the side walls 12 of the furnace. The sloping banks 30 build up in the furnace until the top of each bank reaches the longitudinal slots 21 formed in the furnace roof 14 at which point the charge material in the sloping banks 30 is in direct contact with the charge material flowing downwardly from the feed hoppers 19. The charge material 27 flowing into the furnace thus completely fills and thereby seals the longitudinal slots 21 formed in the furnace roof 14 as a result of which the entrance of atmospheric air into the furnace and the escape of furnace gases from the furnace through the slots 21 is prevented. In addition, as clearly shown in FIG. 2 the sloping banks 30 of charge material substantially completely cover the side walls 12 of the furnace against which they rest thereby protecting the refractory lining of the side walls against attack by the molten bath 31.

Although the feed hoppers 19 contain no gates or other mechanical closures, it is sometimes desirable to provide each feed hopper with means (for example, a rod) for breaking up any clogging or blockage of the discharge opening that may take place. Accordingly, the term "essentially unimpeded discharge opening" is intended to encompass the presence of such means in or associated with the discharge openings of the hoppers 19. In addition, it is sometimes desirable to provide a mechanical closure of the hoppers 19 when, for example, the furnace is shut down or banked. To this end we advantageously employ a cylindrical plug the diameter of which somewhat exceeds the width of the discharge opening of the hopper 19 and the length of which is just slightly less than the longitudinal length of the hopper. This cylindrical plug (which advantageously may be an approximately five or six foot length of 12 inch diameter steel pipe) is placed longitudinally on top of the charge material in the feed hopper, and as the charge material flows into the furnace through the longitudinal slots the cylindrical plug is gradually lowered to the point where it effectively closes off and thereby seals the hopper. The hopper 19 can be reopened simply by removing the cylindrical plug when furnace operations are resumed.

In the normal operation of a reverberatory furnace adapted to carry out the practice of our invention the smelting of the cupriferous charge material takes place on the surface of the sloping banks 30 and in the molten bath 31 of slag and matte. As the charge material is consumed in the course of the smelting operation fresh charge material automatically flows into the furnace from the hoppers 19 to replenish that which has been consumed. As a result, the smelting operation continues under essentially uniform conditions without the interruptions or temperature fluctuations that are inherent in the slug feeding required by conventional furnace construction and smelting practice. In addition, the choked slot feeding system of our invention automatically prevents the entrance of air or the escape of furnace gases through the charge openings without reliance on trouble-prone mechanical gates or other closures. The substantially uniform smelting conditions prevailing in a choked slot fed furnace significantly improve the metallurgical and thermal efficiency of the smelting operation with consequent significant improvement in fuel economy. Uniform operating conditions also make it possible to make significant improvements in instrumentation and remote control of furnace operations.

From the foregoing description of our new system of choked slot feeding of reverberatory furnaces it will be seen that we have made an important contribution to the art to which our invention relates.

We claim:

1. The method of choked slot feeding of a side charging reverberatory furnace having a longitudinally extending smelting zone in which cupriferous charge material is smelted which comprises providing an external supply of charge material disposed above each longitudinal sidewall of the furnace, each external supply extending longitudinally substantially continuously the full length of said smelting zone, introducing the smelting charge into the smelting zone of the furnace substantially the full length of the smelting zone adjacent each of the two sidewalls of the furnace, said external supplies of charge material being in essentially unimpeded communication with the interior of the furnace whereby the charge material flows freely into the furnace to form sloping banks of charge material disposed against and substantially completely covering the sidewalls of the furnace in the smelting zone, the charge material flowing by gravity from said external supplies of charge material substantially completely filling the longitudinal slots formed in the furnace roof through which said charge material is introduced into the furnace and essentially automatically replenishing the charge material of the sloping banks as this material is consumed in the smelting operation.

2. In the method of smelting cupriferous charge materials in a side charging reverberatory furnace in which the smelting charge material is introduced into the smelting zone of the furnace through the furnace roof at a plurality of longitudinally spaced locations disposed adjacent the two side walls thereof so that the charge material thus introduced into the furnace forms a sloping bank of said material disposed against each side wall beneath each of said longitudinally spaced locations, the improvement which comprises providing an external supply of charge material disposed above each longitudinal sidewall of the furnace, each external supply extending longitudinally substantially continuously the full length of said smelting zone, introducing the smelting charge material into the smelting zone against and adjacent each of the two sidewalls of the furnace, said external supplies of charge material being in essentially unimpeded communication with the interior of the furnace whereby the charge material in each of said external supplies of charge material is in direct contact with the sloping bank of charge material disposed beneath each of said external supplies so that said sloping banks of charge material substantially completely cover the sidewalls of the furnace in the smelting zone, the charge material flowing by gravity from said external supplies of charge material substantially completely filling the longitudinal slots formed in the furnace roof adjacent the sidewalls thereof through which said charge material is introduced into the furnace and essentially automatically replenishing the charge material of the sloping banks as this material is consumed in the smelting operation.

References Cited

UNITED STATES PATENTS

| | | | |
|---|---|---|---|
| 820,134 | 5/1906 | Riveroll | 75—74 |
| 1,992,084 | 2/1935 | McGregor | 75—74 X |
| 2,194,454 | 3/1940 | Greenawalt | 75—74 |
| 3,102,806 | 9/1963 | Zimmerley | 75—74 |

L. DEWAYNE RUTLEDGE, Primary Examiner

G. K. WHITE, Assistant Examiner

U.S. Cl. X.R.

75—92